Figure 1:
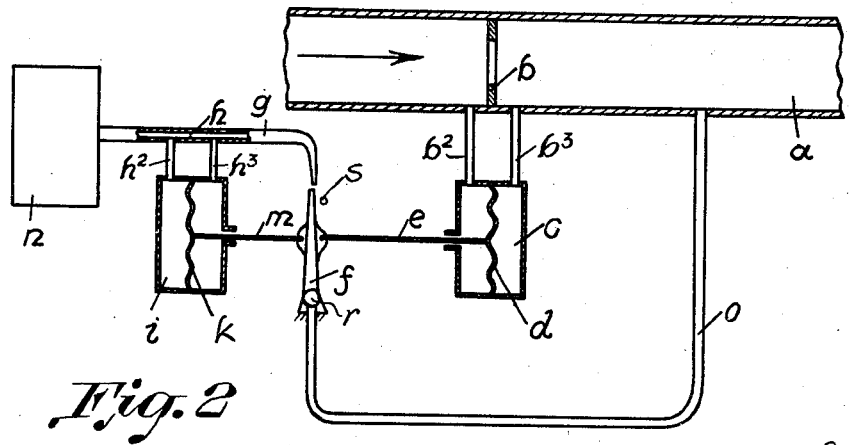

Jan. 23, 1934.　　　G. WÜNSCH　　　1,944,339

PROPORTIONAL GAS METER

Filed May 24, 1929

Inventor:
Guido Wünsch
by
attorney

Patented Jan. 23, 1934

1,944,339

UNITED STATES PATENT OFFICE 1,944,339

PROPORTIONAL GAS METER

Guido Wünsch, Steglitz, near Berlin, Germany, assignor to Askania-Werke A.-G. vorm. Centralwerkstatt Dessau und Carl Bamberg Friedenau, Berlin-Friedenau, Germany Application May 24, 1929, Serial No. 365,714, and in Germany June 22, 1928

8 Claims. (Cl. 73—68)

In measuring large quantities of gas, more particularly in supplying gas to a distance, it has been found that the best method of measurement is the so-called partial current process. In that process the energy of flow of the gas is utilized for dividing the gas current into two parts or branches proportional to each other, the smaller one of which is then measured by a gas meter in a purely volumetric manner. The total quantity is then obtained by multiplication with the fixed ratio between the two partial currents. The measuring of the partial current is effected with the use of an orifice plate or other suitable form of constriction. This arrangement can be used however only when the resistance of the gas meter is small relatively to the difference of pressure at the constriction. For that reason, it is necessary to have fairly large differences of pressure, so that the arrangement can be used in practice only when the smallest gas quantity is not considerably smaller than about one-third of the maximum quantity of gas to be measured.

According to the invention, the gas meter is rendered equally well applicable for the smallest quantity of gas by effecting the measurement with the use of a so-called pressure transformer, in which a jet pipe or other suitable pressure fluid delivery means moves relatively to an opposed nozzle or port communicating with a suitable tube so as to produce in said tube, according to the relative position of said jet pipe and said port, a varying gas pressure which produces a flow at a small measuring constriction formed by an orifice plate for example. The measuring pressure of this gas flow acts on the jet pipe so as to set it back relative to the opposed nozzle port, so that an equilibrium is established between the measuring pressure started and the back pressure produced. In that way, at said constriction a flow is produced which is exactly proportional to the main flow.

This arrangement can however suffer from the drawback that the measurement does not take account of the specific gravity of the measured gas. In order to make this possible, the jet pipe of the pressure transformer may be fed with the gas to be measured, so that the proportional gas current also will be constituted always by gas of the same specific pressure.

This arrangement has the advantage that the work at the secondary constriction can be done with high differences of pressure, while at the main constriction on the contrary with very low differences of pressure, so that the loss of pressure will be only a very small one. The partial current is then volumetrically measured in an ordinary gas meter and may be then used if desired for the working of calorimeters, gas testers, etc.

Figure 2:
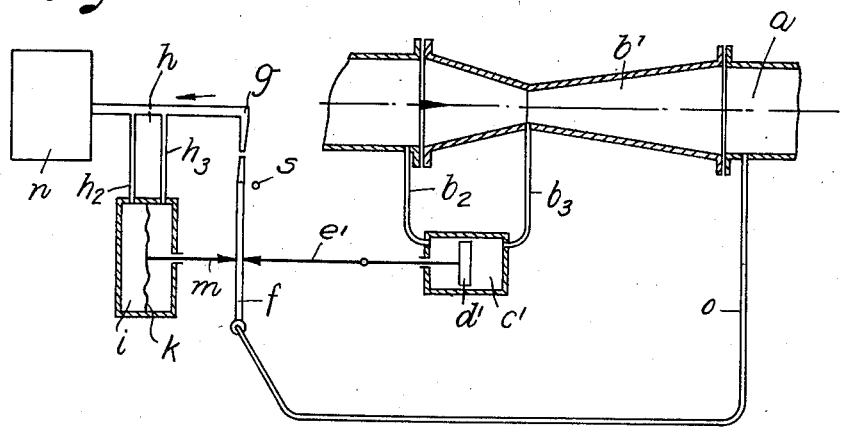

The accompanying drawing diagrammatically illustrates two illustrative constructions embodying the invention, in which Fig. 1 is one form and Fig. 2 is the other.

In the drawing, $a$ is a gas pipe through which the gas, the quantity of which it is desired to measure, flows in the direction of the arrow, and in said pipe there is a constriction herein conveniently constituted by an orifice plate $b$. The differences of pressure produced at the orifice plate is transmitted by pipes $b^2$, $b^3$ to fluid pressure responsive means, herein a diaphragm chamber $c$, the two pipes $b^2$, $b^3$ communicating with said diaphragm chamber at opposite sides respectively of a diaphragm $d$ which is connected in any suitable manner, as by a rod $e$ to a jet pipe $f$ through and from which flows a suitable pressure fluid supplied from any suitable source of supply. In the illustrative embodiment of the invention shown the pressure fluid used is the same gas the quantity of which is to be measured, the jet pipe $f$ being herein connected to the main pipe $a$ by a pipe $o$ for that purpose. The jet pipe $f$, pivoted at $r$ has a fine outlet nozzle, opposite which is arranged a corresponding nozzle or port of a pipe $g$. In the pipe $g$ there is also provided a constriction or orifice plate $h$ which produces a difference of pressure which is transmitted through suitable pipes $h^2$, $h^3$ to suitable fluid pressure responsive means, herein a diaphragm chamber $i$, said two pipes communicating with said diaphragm chamber at opposite sides respectively of a diaphragm $k$ of said diaphragm chamber, which diaphragm is connected through a rod $m$ to the other side of the jet pipe. The pipe $g$ opens into a gas meter $n$ of the desired construction.

The presence of the orifice plate $b$ in the main gas current produces an increase in pressure in front of the orifice plate $b$ in the main pipe, and a depression behind the orifice plate $b$. As the current flows from left to right, referring to Fig. 1, the increase in pressure in front of the orifice plate $b$ is transmitted to the left side of the diaphragm $d$ of the chamber $c$, while the depression behind the orifice plate $b$ is transmitted to the right side of the said diaphragm $d$. The difference in pressure tends, therefore, to move the diaphragm $d$ to the right, so that a pull is exerted on the jet pipe $f$ by the rod $e$. The current of gas leaving the jet pipe is caught more or less by the nozzle or port of the pipe $g$ and flows through the pipe $g$ and the constriction $h$ in a direction from right to left. An increase in pressure is thus produced on the right side of the constriction $h$ and a depression on the left side thereof. The increase in pressure is transmitted to the right side of the diaphragm $k$ of diaphragm chamber $i$, and the depression is transmitted to the left side of said diaphragm, so that the difference in pressure tends to move the diaphragm $k$ from right to left. Thus, by means of the rod $m$, a pull proportional to the difference in the pressure on opposite sides of the constriction $h$ is transmitted to the jet pipe $f$. The pulls exerted by the diaphragms $k$ and $d$ on the jet pipe $f$ are, therefore, opposed to one another. Since, however, the quantity of gas flowing past the constriction $h$ depends upon the position of the jet pipe $f$ relative to the opposed nozzle or intake port of the pipe $g$, the difference in pressure across the constriction $h$ also depends upon the position of the jet pipe relative to said nozzle of tube $g$, and consequently also upon the force exerted upon the diaphragm $k$ and transmitted to the jet pipe $f$ by the rod $m$. The jet pipe $f$, therefore, moves into a position of equilibrium, in which the forces exerted upon the diaphragms $k$ and $d$ are in equilibrium. If, for example, the diaphragms $k$ and $d$ are equal in area, the condition of equilibrium will be set up when the differences in pressure exerted upon the diaphragms $k$ and $d$ are equal, that is to say, the difference in pressure in the main pipe $a$ across the orifice plate $b$, and the difference in pressure in the pipe $g$ across the constriction $h$ are equal to one another. In this case the quantities flowing through the orifice plates $b$ and $h$ are proportional to the square of the pressure differences, and since the latter are equal to one another, the quantities are proportional to the diameters of the orifice plates or constrictions $b$ and $h$. If there is any variation in the quantity of gas flowing through the pipe $a$, the difference in pressure on either side of the constriction varies, thus upsetting the equilibrium of the forces exerted upon the diaphragms $d$ and $k$, and therefore, upon the jet pipe $f$. For example, if the quantity flowing through the pipe $a$ is diminished, the pressure difference exerted upon the diaphragm $d$ is also reduced. The difference in pressure on the diaphragm $k$ predominates so that the jet pipe $f$ is moved to the left. Consequently less gas is conveyed to the pipe $g$, the quantity flowing past the constriction $h$ becomes less, this quantity diminishing as the jet pipe $f$ moves further to the left. A position of equilibrium must be set up, therefore, at which there is proportionality between the two currents of gas in the pipe $a$ and tube $g$.

In place of the orifice plates, other means can be used producing a difference of pressure, for instance a Venturi tube or other form of constriction. In place of the diaphragm chambers, cylinders with pistons adjustable in the same or other fluid pressure responsive means may be used.

Fig. 2 shows a modified form of construction which differs from that shown in Fig. 1 in that a Venturi tube $b^1$ is substituted for the orifice plate $b$; further the diaphragm chamber $c$ has been replaced by a cylinder $c^1$ containing a piston $d^1$ and a piston rod $m$. The other parts correspond exactly to those shown in Fig. 1, so that further description is unnecessary.

Referring to Figs. 1 and 2, a stop $s$ will preferably be located at the right of the jet pipe to limit movement of the latter to the right, said stop arresting movement of the jet pipe when the latter reaches a position such that its discharge opening registers substantially exactly with the intake port of the tube $g$, and the latter receives the maximum gas current from said jet pipe.

I claim:

1. A proportional gas meter more particularly for large gas quantities, comprising in combination with a main gas pipe; means for producing a pressure difference in the said main pipe; a jet pipe device; means to supply said jet pipe device with pressure fluid to be discharged therefrom; a tube; means whereby said jet pipe device is controlled by the said pressure difference in the main pipe to convey to said tube a partial current proportional to the main current; means in said tube for producing a pressure difference also in said partial current; means responsive to said pressure difference in said partial current to act on the jet pipe of the jet pipe device in the opposite direction to the action of the first-mentioned pressure difference in the main gas pipe; and a gas meter for measuring the quantity of the said partial current.

2. A proportional gas meter more particularly for large gas quantities, comprising in combination with a main gas pipe, means for producing a pressure difference in the said main pipe; a jet pipe device; means to supply said jet pipe with gas from said main pipe to be discharged from said jet pipe device; a tube; means whereby said jet pipe device is controlled by the said pressure difference in the main pipe to inject into said tube a partial current proportional to the main current; means in said tube for producing a pressure difference also in the partial current; means responsive to said pressure difference produced in said partial current to act on the jet pipe of the jet pipe device in the opposite direction to the action of the first-mentioned pressure difference in the main gas pipe; and a gas meter for measuring the quantity of the said partial current.

3. In apparatus of the class described, in combination, a gas pipe through which flows a current of the gas to be measured, said gas pipe being provided with a constriction; means including a diaphragm chamber comprising a diaphragm, said diaphragm chamber communicating at opposite sides of its diaphragm with said gas pipe at opposite sides of said constriction; a gas meter; a tube communicating with said meter and provided with an intake port and a constriction; means including a second diaphragm chamber comprising a diaphragm and communicating at opposite sides of its diaphragm with said tube at opposite sides of its constriction; a jet nozzle movable relatively to the port of said tube and adapted to inject a gas, supplied thereto from a suitable source, through said port into said tube; means intermediate said diaphragms and said nozzle to act oppositely thereon in response to the pressure differences created in said pipe and in said tube by said constrictions.

4. In apparatus of the class described for use more particularly with systems including a pipe through which flows a current of the gas to be measured, in combination, means comprising a constriction for producing a pressure difference in said pipe; means including a diaphragm chamber comprising a diaphragm, said diaphragm chamber communicating at opposite sides of its diaphragm with said gas pipe at opposite sides of said constriction; a tube for connection to a gas meter and provided with an intake port and with a constriction for producing a pressure difference in said tube when a current of gas flows through the latter; means including a second diaphragm chamber comprising a diaphragm and communicating at opposite sides of its diaphragm with said tube at opposite sides of the latter's constriction; a jet nozzle movable relatively to the port of said tube and adapted to inject through said port into said tube a current of gas supplied thereto from the supply of gas to be measured, means intermediate said diaphragms and said nozzle and tending to move the same in opposite directions in response to the pressure differences created in said pipe and in said tube.

5. In apparatus of the class described for use more particularly with a system including a pipe through which flows a current of gas to be measured, in combination, means to produce a pressure difference in said pipe; a tube for connection to a gas meter and having a portion provided with an intake port; means to produce a pressure difference in said tube when a current of gas flows through the latter; current delivery means to deliver a current of gas to said tube through its port, the intake portion of said tube and said current delivery means being relatively movable; and means responsive to the pressure difference in said pipe and to the pressure difference in said tube to produce relative movement of said current delivery means and said intake port portion of said tube, thereby to control the amount of current delivered by said current delivery means to said tube and create in the latter a gas current proportional to the gas current in said pipe.

6. In apparatus of the class described for use more particularly with a system including a pipe through which flows a current of gas to be measured, in combination, means to produce a pressure difference in said pipe; a tube for connection to a gas meter; an oscillatory nozzle to inject gas into said tube to produce a gas current therethrough; means to produce a pressure difference in said tube when gas flows through the latter; means responsive to pressure differences produced in said gas pipe and means responsive to pressure differences produced in said tube, said two means acting oppositely upon said nozzle to move the latter relatively to said tube to control the amount of gas injected by said nozzle into said tube, thereby to produce a gas current in said tube proportional to the gas current in said gas pipe.

7. In apparatus of the class described for use more particularly with a system including a pipe through which flows a current of gas to be measured, in combination, means to produce a pressure difference in said pipe; a tube for connection to a gas meter; an oscillatory nozzle to inject into said tube gas from the source of gas to be measured to produce a gas current through said tube; means to produce a pressure difference in said tube when gas flows through the latter; means responsive to pressure differences produced in said gas pipe and means responsive to pressure differences produced in said tube, said two means acting oppositely upon said nozzle to move the latter relatively to said tube to control the amount of gas injected by said nozzle into said tube, thereby to produce a gas current in said tube proportional to the gas current in said gas pipe.

8. In apparatus of the class described for use more particularly with a system including a pipe through which flows a current of gas to be measured, in combination, means to produce a pressure difference in said pipe; a tube for connection to a gas meter; an oscillatory nozzle to inject gas into said tube to produce a gas current therethrough; means to produce a pressure difference in said tube when gas flows through the latter; means responsive to pressure differences produced in said gas pipe and means responsive to pressure differences produced in said tube, said two means acting oppositely upon said nozzle to move the latter relatively to said tube to control the amount of gas injected by said nozzle into said tube, thereby to produce a gas current in said tube proportional to the gas current in said gas pipe; and means to arrest movement of said nozzle when the latter is in position to deliver the maximum current of gas to said tube.

GUIDO WÜNSCH.